May 14, 1957 R. E. KIRBY ET AL 2,792,212

MULTIPLE STATION HORIZONTAL SCANNER

Filed June 30, 1954 5 Sheets-Sheet 1

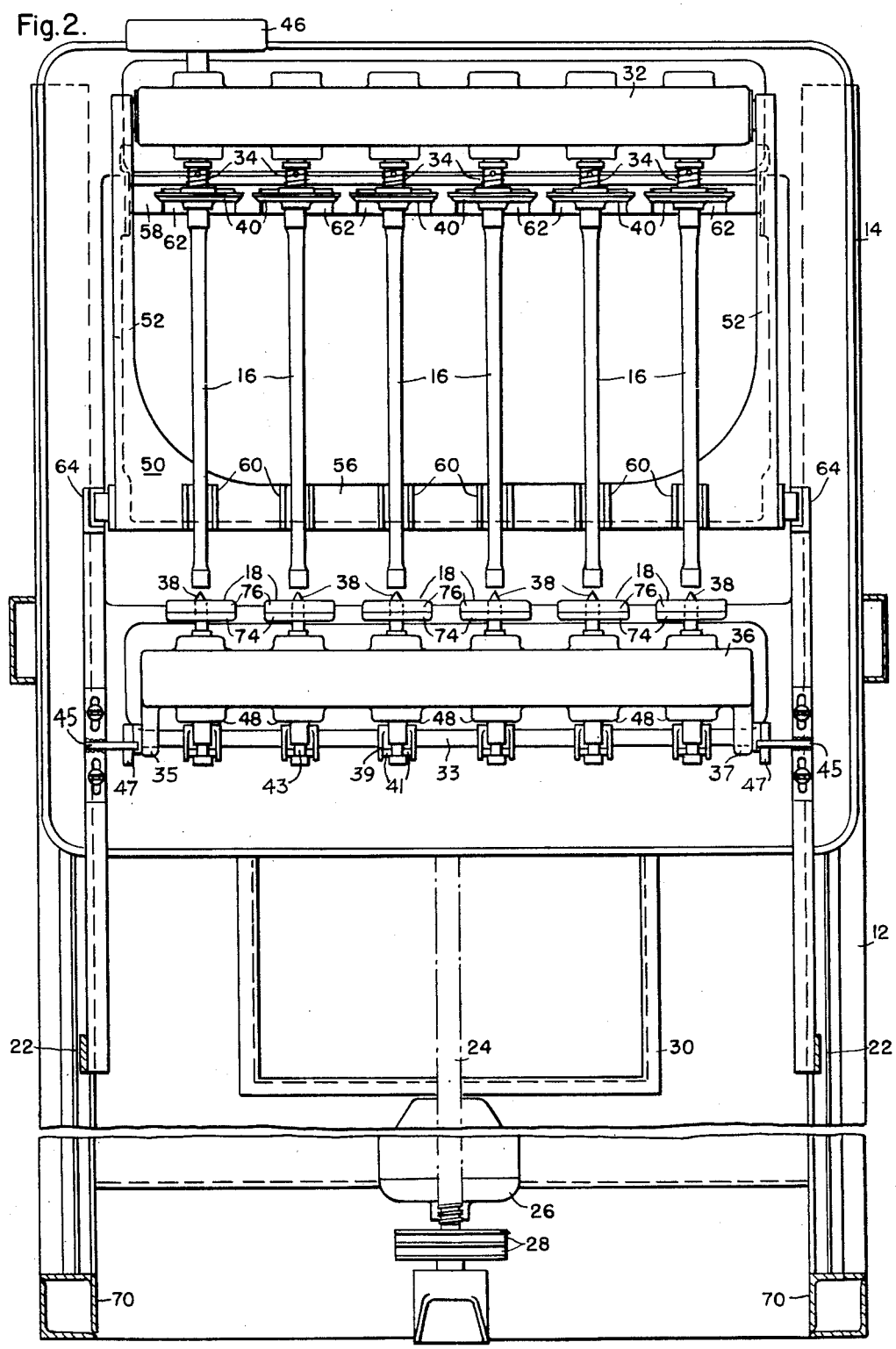

May 14, 1957

R. E. KIRBY ET AL 2,792,212

MULTIPLE STATION HORIZONTAL SCANNER

Filed June 30, 1954

WITNESSES:
E. A. McCloskey.
Robert L. Braham

INVENTORS
Robert E. Kirby,
William H. Anderson
and Milton P. Vore.
BY
F. E. Browder
ATTORNEY

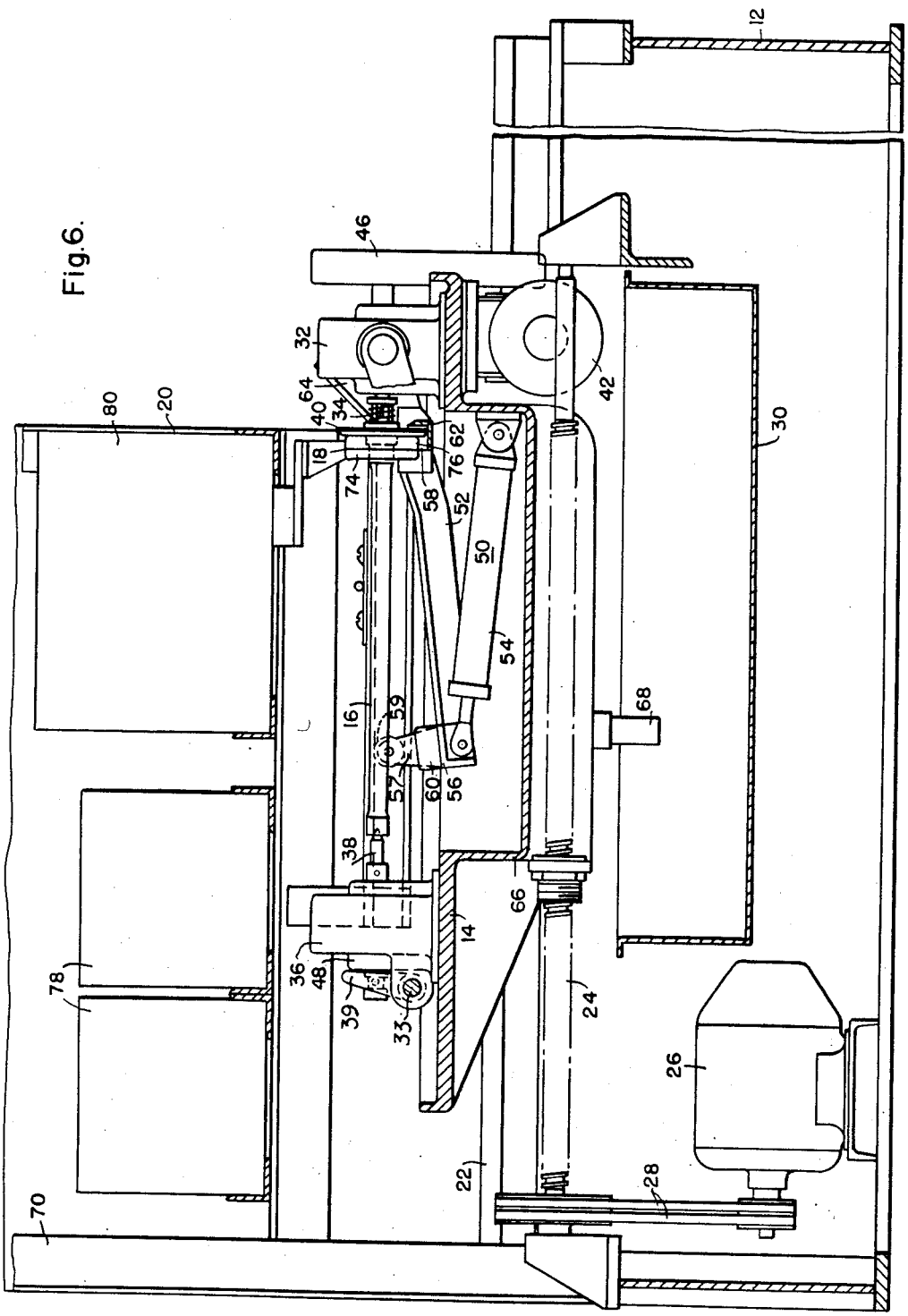

United States Patent Office — 2,792,212 — Patented May 14, 1957

2,792,212
MULTIPLE STATION HORIZONTAL SCANNER

Robert E. Kirby, Catonsville, William H. Anderson, Elkridge, and Milton P. Vore, Catonsville, Md., assignors to Westinghouse Electric Corporation, East Pittsburgh, Pa., a corporation of Pennsylvania Application June 30, 1954, Serial No. 440,446

5 Claims. (Cl. 266—4)

The present invention relates to induction heating apparatus for the heat treatment of metallic workpieces and, more particularly, to induction heating apparatus for the heat treatment of the outer surfaces of metallic bodies, such as automobile axles, by scanning the surfaces of the bodies with heating members.

One object of this invention, accordingly, is to provide an improved induction heating apparatus for the heat treatment of the outer surfaces of metallic bodies, such as automobile axles.

It is another object of this invention to provide an induction heating apparatus for hardening the surfaces of metallic bodies, while limiting the depth of the hardening treatment so that a substantial portion of the bodies are not hardened and hence the bodies retain sufficient resilient ductility.

It is a further object to provide an improved induction heating apparatus for surface hardening metallic bodies, such as axles, to facilitate high speed production.

It is an additional object to provide an improved induction heating apparatus for hardening metallic bodies, particularly bodies whose length dimensions are a multiple of the greatest dimension of their cross section, which apparatus utilizes novel apparatus for simplifying the operation of the handling of the workpieces being heat treated in the apparatus, with the loading and unloading operation occurring at the same physical position on the apparatus. The novel apparatus also relieves the operator from the necessity of centering the metallic bodies, such as axles, in the machine.

It is a different object to provide an improved induction heating apparatus for hardening metallic bodies, such as axles, in which the bodies are scanned by a heat treatment member which both heats and quenches the bodies to produce the desired amount of surface hardening.

These and other objects of the invention are effected as will be apparent from the following description and claims, taken in accordance with the accompanying drawings which form a part of this application and in which like numerals are employed to designate like parts throughout the same.

Fig. 2 is a plan view of one of the scanner units shown in Fig. 1;

Figure 1:
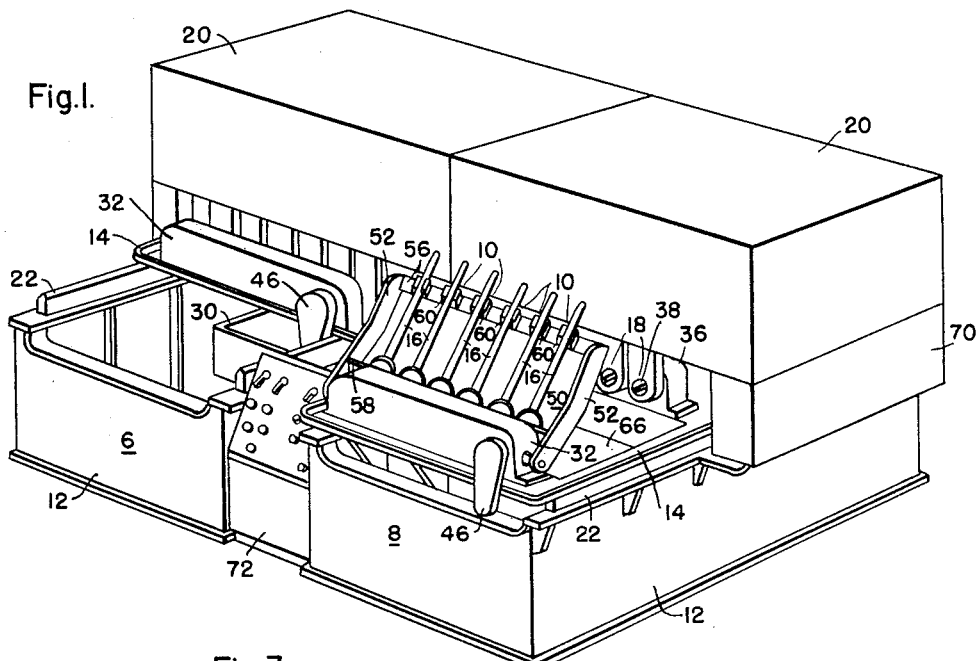
Figure 1 is a perspective view of an induction heating apparatus in accordance with one embodiment of our invention in which two scanner units are shown with each scanner unit consisting of six heating stations.
Figure 5:
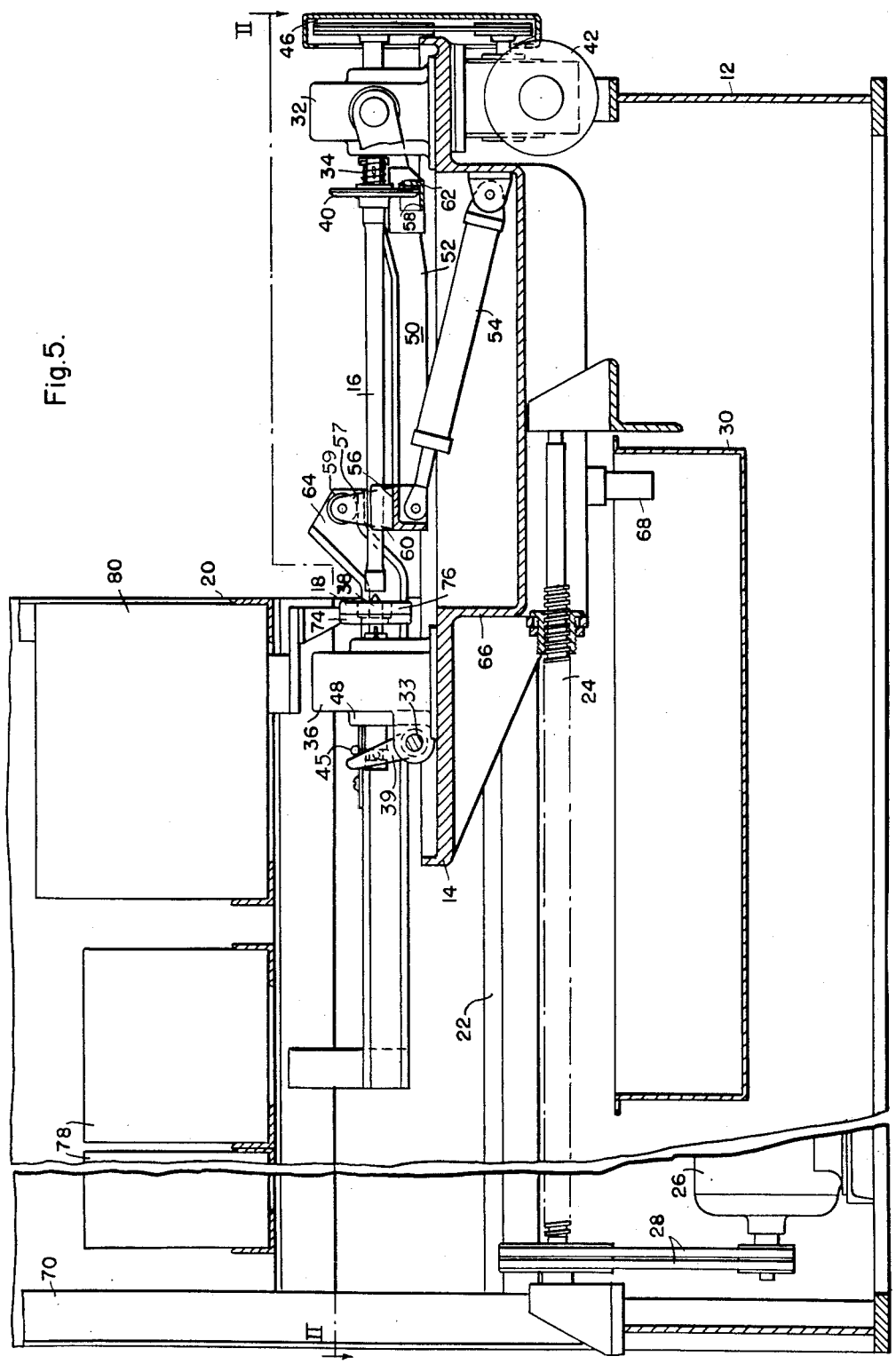

Fig. 5 is a side sectional view of the heating apparatus shown in Fig. 1 with parts broken away for clarity and with the view showing the position of the workpiece when it is being supported by both the positioning means and the support members provided on the carriage member. This position occurring both at the time when the workpiece has just been lowered from the loading position and also at the time when the workpiece is about to be raised to the unloading position; and, Fig. 6 is a side sectional view of the heating apparatus shown in Fig. 1, with parts broken away for clarity and with the view showing the position of the workpiece when it has been moved to the "ready" position just before it is returned through the heat treating means to the position shown in Fig. 5.

In accordance with one embodiment of our invention, as shown in Fig. 1, the induction heating apparatus consists of two scanner units 6 and 8. Each of the units has a plurality of heating stations 10. In the units shown in Fig. 1 there are six heating stations per unit. The heating apparatus may have a base member 12 for each of the units, with the carriage members 14 supported by the base members 12 and operable to be moved thereon. Each carriage member supports the six workpieces 16 to be heat treated, and six stationary heating and quenching members 18 are provided on each unit for scanning the workpieces 16. Mounted above the base member 12 and the carriage member 14 is the housing 20 for the power factor correction capacitors and the current transformers. The three motor-generator sets for supplying power to the heating members may be located remote from the induction apparatus. Since both units are similar and like numerals for like parts are utilized in showing both units, the following description of the scanner unit shown in Figs. 2, 3, 4, 5 and 6 will apply to both units.

The base member 12 is provided as a support for the carriage member 14. A suggested material for this base member is heavy steel weldment. Horizontal V-ways 22 are attached to the top edges of the sides of the base member. The carriage member 14 is operable to be moved, while being supported on these V-ways 22 by a suitable linking means, such as drive screw 24 or a chain and sprocket, mounted in the base member 12 which linking means is driven by the motor 26 connected to the drive screw by the belts 28. A sink 30 which acts as a reservoir and receives the quench water discharged from the carriage member 14 is also mounted in the base member 12.

The carriage member 14 is mounted on the V-ways through bronze V-slippers. Mounted on the carriage member 14 at the front end or operator's end of the carriage member is a first support member 32. This first support member 32 is positioned in a lateral direction relative to the carriage member 14. This first support member 32 contains six parallel rotating center members 34 which are positioned across the first support member. A second support member 36 having six retractable center members 38 is mounted on the carriage member 14 in a parallel arrangement with the first support member 32 in such a position that the second support member 36 in combination with the first support member 32 is operable to support the six workpieces 16 to be heat treated between their respective center members in such a manner that the workpieces may be moved by the carriage member 14 in a direction that is substantially parallel to the axis of the workpiece, with the axis of the workpiece being parallel to the lengthwise dimension of the workpiece. The rotating center members 34 of the first support member 32 may have nubs provided on their outer surface to engage holes in the flanges 40 of the workpieces 16 to provide a positive drive for workpiece rotation. The centers 34 of the first support member 32 are rotated by means of gears 44 and a motor 42 and associated parts 46 which are preferably mounted on the front or operator's side of the carriage member 14 and enclosed by the first support member 32. On the rear of the carriage member are mounted bearings and mechanisms for operating the six retractable centers 38 in the second support member 36.

The retractable center members 38 are slidably supported for axial movement in the second support member 36, and may be provided with spring biasing means for urging the center into engagement with the workpiece.

A rotatable shaft 33 is journalled near its ends in projections 35 and 37 at each end of the second support member 36 so that the shaft 33 extends transversely of the carriage member 14 in a position behind the second support member 36 and below the retractable center members 38. A plurality of bell crank members 39 are rigidly attached to shaft 33 in spaced relation along the shaft. The upwardly extending ends of the bell cranks 39 are each provided with a pivot means 41 for respectively engaging a reduced diameter portion 43 near the rearward end of each retractable center member 38.

As best shown in Figures 2 and 5 there are provided a pair of adjustably positioned indexing pins 45 which are supported from the upper flange of the cam track 64, and extend inwardly in substantial parallelism with shaft 33. A pair of upwardly extending lever members 47 are provided at the transversely spaced ends of shaft 33 and are rigidly attached to the shaft. When carriage member 14 is in its forwardmost position as best shown in Figure 5 the lever members 47 are respectively engaged by the indexing pins 45, and shaft 33 is rotated counterclockwise against the pressure of the spring biasing means to thereby retract the centers 38.

As the carriage member 14 moves toward the rear of the unit, the lever members 47 disengage from the indexing pins 45, thereby allowing the shaft 33 to rotate clockwise, and the centers 38 move into engagement with the workpiece 16 in response to the urging of the spring biasing means.

A positioning member 50 is provided for loading and unloading the workpieces. This positioning member 50 has a cradle 52 which is attached or hinged on the first support member 32 at the front of the carriage member 14 and is raised and lowered by means of the cylinder 54, so that the positioning member pivots about the first support member. The positioning member 50 may also include two racks 56 and 58 with the racks being positioned perpendicular to the cradle 52 and parallel to the support members with the two ends of the racks being attached to the cradle. The first rack 56 is provided with six V-block sections 60 for supporting the workpieces in a direction which is perpendicular to the axes of the workpieces. The second rack 58 is provided with six supporting sections 62 which support the workpieces in a direction which is perpendicular to the axes of the workpieces and also in a direction which is coaxial with the workpieces. The first rack 56 is positioned by the cam track 64 which locates the workpieces and guides them to the center members for final positioning.

Rigidly connected to the outer edges of positioning member 50 are a pair of cam support members 57 and a pair of cam rollers 59 supported thereon.

As positioning member 50 is lowered by means of cylinder 54, the cam rollers 59 will first contact the inner face of the cam tracks 64. Rollers 59 will thereafter rollingly support positioning member 50 so as to guide the ends of workpieces 16 into engagement with retractable centers 38. As the carriage member 14 moves toward the rear of the unit, the cam rollers 59 will travel down the sloping portion of tracks 64 to thereby dispose positioning member 50 substantially within tank 66 so that the V-block sections 60 will pass beneath the quench member 76.

The lower part of the carriage member is in the form of a tank 66 to collect the quench water after the quenching of the workpiece. Ducts 68 are provided to empty the quench water from the carriage member 14 into the sink 30 provided in the base member 12. It is preferable that all parts of the carriage be made of non-corrosive material.

Positioned above the base member and carriage member is the housing 20 for the power factor correction capacitors 78 and the current transformers 80. This housing is supported by any suitable means such as the support columns 70. It is suggested that the housing be constructed from heavy aluminum for maximum shielding and minimum electrical loss.

Positioned adjacent to and preferably attached to the housing are six heaters 18. These heaters are so positioned that the workpieces may pass through the heaters 18 in a direction that is parallel to the axes of the heaters. It is preferable that the position of the heaters be so adjusted that the workpieces will move through coaxially relative to the heaters. The heaters 18 comprise the heating member 74 and the quenching member 76 with a suitable source of quenching medium connected to the quenching member 76.

A switching station may be positioned between the two units 6 and 8 described above. Also positioned between the two units and in front of the switching station may be the control cabinet 72. It is suggested that the panel of this control cabinet might contain indicating lights, start and stop controls and selector switches as well as manual operating controls for testing the quench and scanning operations. The motor-generator sets (not shown) with their built-in control can be located remotely.

Figure 4:
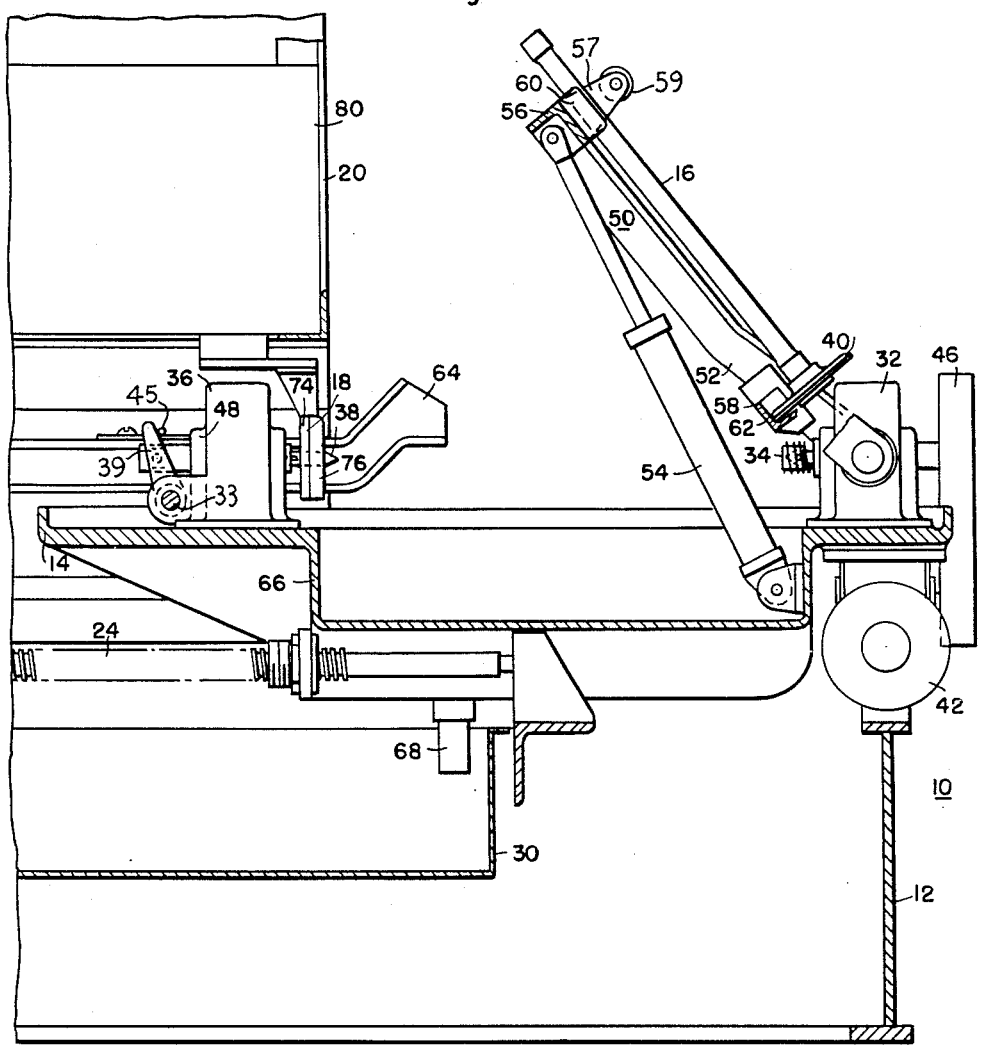
Fig. 4 is a side sectional view of the apparatus shown in Fig. 1 with parts broken away for clarity and with the view showing the position of a workpiece when it is loaded onto or unloaded from the positioning means.

In accordance with our invention as shown in Figs. 4, 5 and 6, in the operation of a heating station 10 of the apparatus, the cradle 52 will be pivoted about the first support member 32 to a position where it is at an angle to the carriage member 14 as shown in Fig. 4. After an unhardened workpiece 16 has been placed in the positioning member 50, it is lowered and the carriage member 14 is moved toward the rear of the unit as the workpiece is started on its heat treating cycle. As the carriage member 14 is moved, the retracting center member 38 of the second support member 36 is released. By means of this retracting center member 38 and the rotating center member 34 of the first support member 32 the workpiece 16 is removed from the V-block section 60 of the first rack 56 and the supporting section 62 of the second rack 58 of the positioning member 50 as shown in Fig. 5. The positioning member 50 drops to the bottom of the carriage member 14 and the carriage member continues to move to the rear of the apparatus with the workpiece 16 supported and rotated between the first support member 32 and second support member 36 and passes through the heater 18. However, the workpiece 16 is not heated since there is no power supplied to heating member 74 during this part of the cycle of the workpiece.

When the workpiece 16 reaches the rear of the apparatus as shown in Fig. 6 it is in the "ready" position prepared to start its heating portion of the cycle. Power is supplied to the heating member 74 from a motor-generator set (not shown). The workpiece 16 is held in the "ready" position until the portion of the workpiece that is nearest to the heater 18 reaches the proper temperature. Then the quenching medium is caused to flow through the quenching member 76 and the carriage member 14, still supporting the workpiece 16 between its first and second support members 32 and 36, is moved toward the front of the heating station 10.

After the entire workpiece 16 has passed through the heater 18 and is in a position as shown in Fig. 5, the power is removed from the heating member 18 and the quenching medium is caused to cease flowing out of the quenching member 76. The cradle 52 is pivoted upward until the V-block section 60 of the first rack 56 and the supporting section 62 of the second rack 58 engage the workpiece 16. The center member 38 of the second support member 36 of the carriage member 14 is retracted. The positioning member 50 continues in its upward swing until it lifts the workpiece 16 to its unload position as shown in Fig. 4. The heat treating cycle of the workpiece is then completed.

Figure 3:
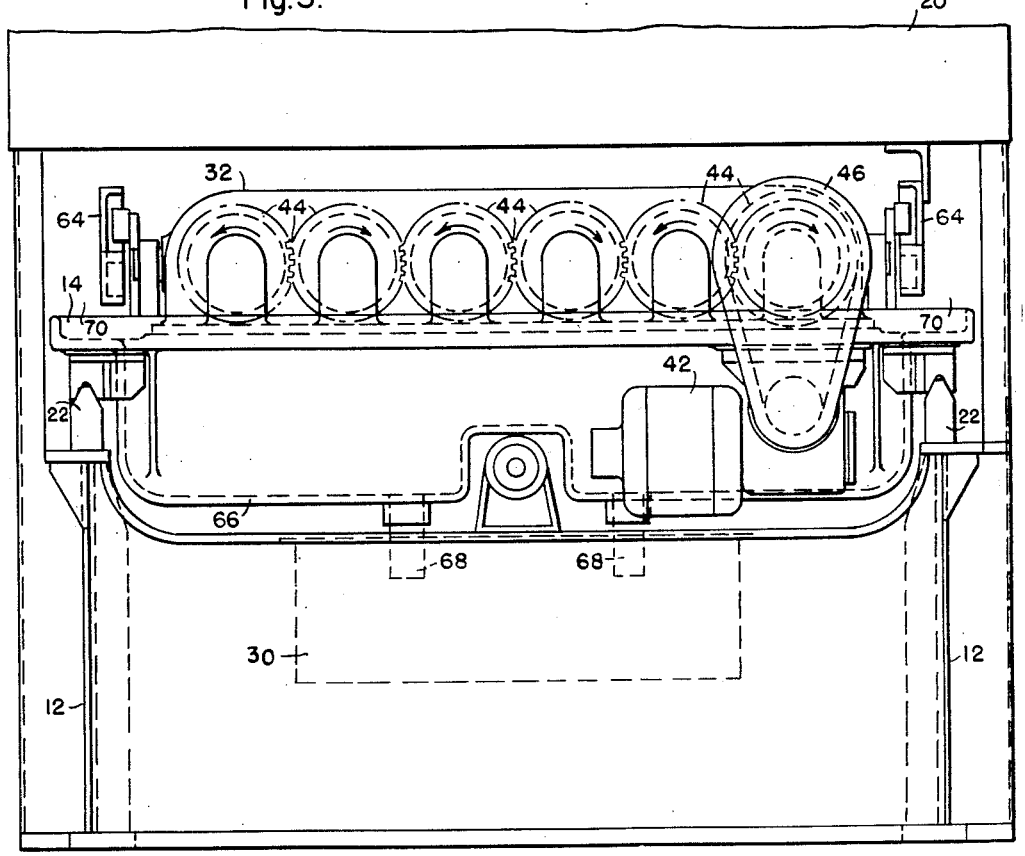
Fig. 3 is an end view of one of the scanner units shown in Fig. 1.

In accordance with the apparatus shown in Figs. 1, 2 and 3, the six heating stations 10 of the first scanner unit 6 work concurrently similar to the manner described above and the six heating stations 10 of the second scanner unit 8 work concurrently in the same manner. For convenience and clarity in understanding the combined operation of the first scanner unit 6 and second scanner unit 8 let it be assumed that the first scanner unit has been moved to the unloading and loading position shown in Fig. 4 while the second scanner unit is about to be moved from its "ready" position shown in Fig. 6 through the heating portion of its cycle. After the unhardened workpieces 16 have been placed on the supporting sections 60 and 62 of the first rack 56 and second rack 58 of the positioning member 50 of the first scanner unit 6, the cylinder 54 is started which causes the raised positioning member 50 to lower and the carriage member is started toward the rear of the unit by means of motor 26. As the carriage member 14 of the first unit 6 is moved, the retracting center members 38 of the second support member 36 of the first unit are released and in conjunction with the rotating centers 34 of the first support member 32, remove the workpieces from the positioning member 50. The positioning member 50 then is lowered in the tank 66 of the carriage member 14. The carriage member is moved toward the rear of the first unit 6. Meanwhile the carriage member 14 of the second unit 8 has moved from the "ready" position shown in Fig. 6 toward the position shown in Fig. 5. When the carriage member 14 of the first unit 6 has reached the rear of the first unit and is in the "ready" position, the workpieces 16 on the carriage member 14 of the second unit 8 will have been heat treated and will be in the position shown in Fig. 5. The output of the three motor-generator units (not shown) will then be switched from the heating members 74 of the second unit to the heating members 74 of the first unit and the carriage member 14 of the first unit 6 is moved toward the front of the unit so that the workpieces 16 of the first unit will pass through the heating portion of their cycle in a manner as described above for each heating station 10. At the time when the workpieces 16 have entirely passed through the heating members 74 of the heaters 18, the output of the motor-generator sets is switched to the heating units 74 of the second unit whose carriage member 14 by this time has been unloaded, loaded and returned to the "ready" position. The quenching of the workpieces 16 in the first unit 6 is continued for the proper length of time and then the workpieces are unloaded in a manner as described above. The unload-load operation is carried out and the complete cycle is repeated.

There are many advantages in using this apparatus having two units with the first scanner unit operating in a cycle which is 180° out of phase, relatively speaking, with the cycle of the second scanner unit. By switching the motor-generator sets from one unit to the other so that each unit is supplied only during its effective heating portion of the heat treating cycle of the workpieces in that unit, a considerable reduction is realized in the cost of the apparatus. Also, since each scanner unit will handle a multiple number of workpieces simultaneously, such as six, the operator is permitted to load and unload the workpieces in both units in a single continuous sequence which permits the operator to have his error time to accumulate to such an extent that there will be no slacking of production rate through normal errors.

In the apparatus, in accordance with our invention, the workpieces are positioned mechanically by the apparatus for easy unloading and loading by the operator, and the operator is relieved from the necessity of placing the workpieces accurately in their centers between the support members on the carriage. Also the workpieces are treated in the horizontal position which permits much closer temperature control across the workpiece. In this particular embodiment, we have shown only two scanner units positioned in a side-by-side arrangement, but it should be realized that a plurality of scanner units could be used and that the units could be grouped in various arrangements such as an end-to-end arrangement.

While we have shown our invention in particularly one embodiment it will be obvious to those skilled in the art that it is not so limited but is susceptible of various changes and modifications without departing from the spirit thereof.

We claim as our invention:

1. In an induction heating apparatus for heat treating a workpiece, said workpiece having an axis and a first end portion and a second end portion, the combination of a heater member having an axis, a carriage member and a positioning member, said positioning member having an end portion and provided for positioning and supporting said workpiece, with said carriage member having a first support member and a second support member, said first and second support members respectively being operative to support said workpiece at the respective first and second end portions of the workpiece and to move said workpiece coaxially relative to said heater member, said positioning member having its end portion pivotally connected to said first support member and being operable to move said workpiece from a coaxial position relative to said heater member to a position where the axis of said workpiece intersects the axis of said heater member at a predetermined angle.

2. In an induction heating apparatus for heat treating a workpiece, said workpiece having an axis and a first end portion and a second end portion, the combination of a heating member having an axis and a quenching member having an axis, with said heating member and said quenching member being coaxially positioned to provide a workpath, a base member, a carriage member and a positioning member, with said carriage member being operative to move on said base member in a direction parallel to said workpath, said carriage member having a first support member and a second support member, said first and second support members being operative to support and rotate said workpiece at the respective first and second end portions of the workpiece and to produce movement of said workpiece along said workpath and coaxially relative to said heater member by movement of said carriage member, said positioning member having an end portion and being provided for positioning and supporting said workpiece, with said positioning member having its end portion attached to said first support member and being operable to pivot about said first support member and thereby move said workpiece from a coaxial position relative to said heating and quenching members to a position where the axis of said workpiece intersects the axis of said heater member at a predetermined angle.

3. In an induction heating apparatus for heat treating a plurality of workpieces, each of said workpieces having an axis, the combination of a carriage member, a plurality of heater members, each of said heater members having an axis, and a positioning member, said carriage member having a first support member and a second support member, said first support member having a plurality of spaced rotating center members and said second support member having a plurality of spaced retractable center members, said first support member and said second support member being so positioned such that each of said workpieces may be positioned and supported between one combination of respectively a rotating center member and a retractable center member, and thereby said carriage member is operative to move said workpieces coaxially and concurrently relative to the respective heater members, said positioning member having an end portion and provided for positioning and supporting the workpieces, with the end portion of said positioning member being attached to said first support member, said positioning member being operable to pivot about said first support member and to move said workpieces concurrently and in parallel arrangement from a position where each of the workpieces is in a coaxial position relative to its respective heater member to a position where the axis of each of the workpieces intersects at a predetermined angle the axis of the respective heater member for each of the workpieces.

4. In an induction heating apparatus for heat treating a workpiece, said workpiece having an axis and a first end portion and a second end portion, the combination of a heater member having a longitudinal axis, a base member, a carriage member and a positioning member, said base member being operative to support said carriage member and to effect movement of said carriage member on said base member in a direction substantially parallel to the axis of said heater member, said carriage member having a first support member and a second support member, said support members having centers, with said centers being operable to support and rotate said workpiece at the respective first and second end portions of the workpiece, with the movement of said carriage effecting the movement of said workpiece coaxially relative to the heater member in an oscillating motion, said positioning member having an end portion and provided for supporting said workpiece until it is positioned between said support members, with the said end portion of the positioning member being attached to said first support member, said positioning member being operable to pivot about said first support member and move the workpiece from a position where the axis of the workpiece intersects the axis of said heater member at an angle to a position where the workpiece is in a coaxial position relative to said heater member.

5. In an induction heating apparatus for heat treating a workpiece, said workpiece having an axis, a first end portion and a second end portion, the combination of a heating member having an axis and a quenching member having a longitudinal axis, said heating member and said quenching member being coaxially positioned to provide a workpath, a base member, a carriage member and a positioning member, said base member being operative to support said carriage member and to effect movement of said carriage member on said base member in a direction substantially parallel to said workpath, said carriage member having a first support member and a second support member, said support members having center members, said positioning member having an end portion and being operable to support said workpiece, said end portion of the positioning member being attached to said first support member such that said positioning member is operable to pivot about said first support member and support said workpiece in a position where the axis of the workpiece intersects the axis of said heater member at a predetermined angle, said positioning member being operable to move said workpiece through said angle and position the first and second end portions of said workpiece between the respective center members of said first and second support members such that said workpiece may be supported by said centers, and said carriage being movable to effect the scansion movement of said workpiece coaxially relative to the heating member and the quenching member through a distance equivalent to the length of the workpiece to be heat treated, said movement of the carriage effecting the scanning of said workpiece by said heating and quenching member.

References Cited in the file of this patent

UNITED STATES PATENTS

| | | |
|---|---|---|
| 1,316,993 | Wolever | Sept. 23, 1919 |
| 2,293,534 | Denneen et al. | Aug. 18, 1942 |
| 2,368,809 | Denneen et al. | Feb. 6, 1945 |

FOREIGN PATENTS

| | | |
|---|---|---|
| 942,549 | France | Feb. 10, 1949 |
| 310,347 | Great Britain | Apr. 23, 1929 |
| 441,329 | Great Britain | Jan. 17, 1932 |
| 541,117 | Great Britain | Nov. 13, 1941 |
| 580,870 | Great Britain | Sept. 23, 1946 |